United States Patent
Kailasam et al.

(10) Patent No.: US 9,319,299 B2
(45) Date of Patent: Apr. 19, 2016

(54) METHOD AND APPARATUS FOR LINK AGGREGATION USING LINKS HAVING DIFFERENT LINK SPEEDS

(75) Inventors: Paramesh Kailasam, Thousand Oaks, CA (US); Anand Vinayagam, Northridge, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1358 days.

(21) Appl. No.: 12/020,111

(22) Filed: Jan. 25, 2008

(65) Prior Publication Data

US 2009/0190580 A1    Jul. 30, 2009

(51) Int. Cl.
*H04L 12/701* (2013.01)
*H04L 12/709* (2013.01)
*H04L 12/935* (2013.01)

(52) U.S. Cl.
CPC ............ *H04L 45/00* (2013.01); *H04L 45/245* (2013.01); *H04L 49/30* (2013.01); *Y02B 60/33* (2013.01)

(58) Field of Classification Search
USPC .................................. 370/259, 351, 357, 359
See application file for complete search history.

(56) References Cited

U.S. PATENT DOCUMENTS

| | | | |
|---|---|---|---|
| 7,266,079 B2* | 9/2007 | Fan ............................. | 370/230 |
| 2003/0126246 A1* | 7/2003 | Blouin et al. ................ | 709/223 |
| 2006/0146718 A1* | 7/2006 | Yarvis et al. ................ | 370/238 |
| 2007/0177599 A1* | 8/2007 | Yazaki et al. ............... | 370/392 |
| 2008/0049778 A1* | 2/2008 | Yano et al. .................. | 370/422 |
| 2008/0291826 A1* | 11/2008 | Licardie et al. .............. | 370/230 |
| 2008/0310419 A1* | 12/2008 | Bansal et al. ............. | 370/395.6 |
| 2009/0080328 A1* | 3/2009 | Hu et al. ...................... | 370/230 |
| 2009/0201844 A1* | 8/2009 | Bhatti et al. ................ | 370/312 |

OTHER PUBLICATIONS http://ieeexplore.ieee.org/Xplore/dynhome.jsp, "Amendment to Carrier Sense Multiple Access With Collision Detection (CSMA/CD) Access Method and Physical Layer Specifications", IEEE Std 802.3ad-2000.

* cited by examiner

*Primary Examiner* — Hassan Phillips
*Assistant Examiner* — Gautam Sharma
(74) *Attorney, Agent, or Firm* — Tong, Rea, Bentley & Kim, LLC

(57) ABSTRACT

The invention includes a method and apparatus for forwarding a packet from a first node toward a second node using a link aggregation group that includes as plurality of links connecting the first node and the second node. In one embodiment, a method includes selecting one of a plurality of ports of the link aggregation group using a weighting of the ports according to a respective plurality of port speeds of the ports of the link aggregation group and propagating the packet from the first node toward the second node via the selected one of the ports of the link aggregation group. In one embodiment, the port is selected using a port selection table weighted according to the ports speeds of the ports of the link aggregation group. In one embodiment, for each port of the link aggregation group, the number of table entries of the port selection table is substantially proportional to the port speed of that port of the link aggregation group.

12 Claims, 6 Drawing Sheets

| INDEX FIELD | I1 | I2 | I3 | I4 | I5 | I6 | I7 | I8 |
|---|---|---|---|---|---|---|---|---|
| PORT IDENTIFIER FIELD | PORT 1 | PORT 1 | PORT 2 | PORT 1 | PORT 1 | PORT 1 | PORT 1 | PORT 2 |

METHOD AND APPARATUS FOR LINK AGGREGATION USING LINKS HAVING DIFFERENT LINK SPEEDS

FIELD OF THE INVENTION

The invention relates to the field of communication networks and, more specifically, to link aggregation.

BACKGROUND OF THE INVENTION

Link aggregation is a technique by which multiple physical links connecting two adjacent switches are associated to form a link aggregation group, such that any of the links of the link aggregation group may be used to transmit data between the switches. Link aggregation is defined in Institute of Electrical and Electronics Engineers (IEEE) standard 802.3ad. IEEE 802.3ad, however, requires that all links included in a link aggregation group must have the same link speed.

SUMMARY OF THE INVENTION

Various deficiencies in the prior art are addressed through invention of a method and apparatus for forwarding a packet from a first node toward a second node using a link aggregation group that includes as plurality of links connecting the first node and the second node. In one embodiment, a method includes selecting one of a plurality of ports of the link aggregation group using a weighting of the ports according to a respective plurality of port speeds of the ports of the link aggregation group and propagating the packet from the first node toward the second node via the selected one of the ports of the link aggregation group. In one embodiment, the port is selected using a port selection table weighted according to the ports speeds of the ports of the link aggregation group. In one embodiment, for each port of the link aggregation group, the number of table entries of the port selection table is substantially proportional to the port speed of that port of the link aggregation group.

BRIEF DESCRIPTION OF THE DRAWINGS

The teachings of the present invention can be readily understood by considering the following detailed description in conjunction with the accompanying drawings, in which:

FIG. 3 depicts an exemplary port selection table according to one embodiment;

To facilitate understanding, identical reference numerals have been used, where possible, to designate identical elements that are common to the figures.

DETAILED DESCRIPTION OF THE INVENTION

The present invention enables link aggregation of links having different link speeds. The present invention uses weighted link aggregation, in which a port selection table utilized for choosing between ports of a link aggregation group is weighted according to port speeds of ports of the link aggregation group. In one embodiment, table entries of the port selection table are weighted in a manner substantially proportional to the port speeds of ports of the link aggregation group. In this manner, more efficient utilization of ports in the link aggregation group may be realized. The weighted link aggregation functions of the present invention may be better understood with respect to the following description.

Figure 1:
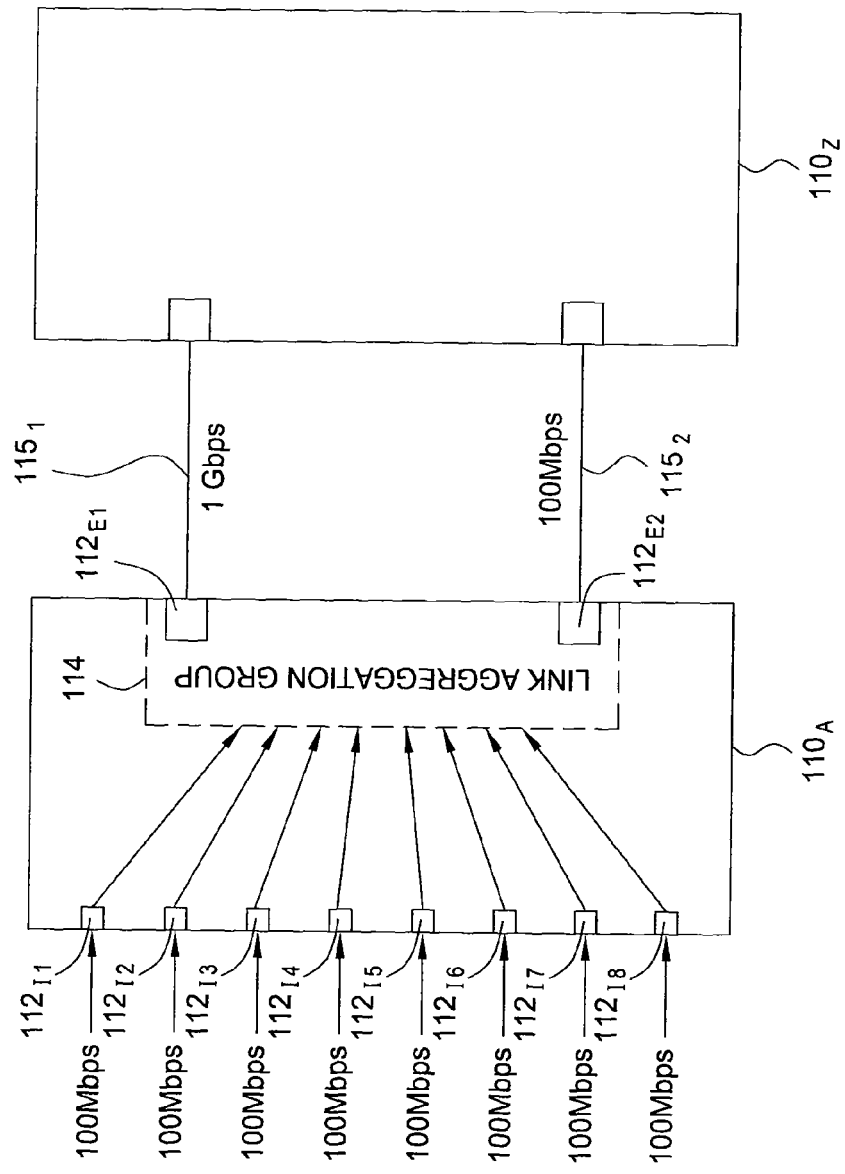
FIG. 1 depicts a high-level block diagram of a communication network.

FIG. 1 depicts a high-level block diagram of a communication network. Specifically, communication network 100 includes a first switch $110_A$ and a second switch $110_Z$ (collectively, switches 110) interconnected via a first link $115_1$ and a second link $115_2$ (collectively, link 115). The first switch $110_A$ includes eight ingress ports (IPs) $112_{I1}$-$112_{I8}$ (collectively, IPs $112_I$). For example, IPs $112_I$ may be connected to other switches, end terminals, and the like, as well as various combinations thereof. The first switch $110_A$ includes two egress ports (EPs) $112_{E1}$-$112_{E2}$ (collectively, EPs $112_E$). The EPs $112_{E1}$ and $112_{E2}$ connect first switch $110_A$ to second switch $110_Z$ via first link $115_1$ and second link $115_2$, respectively. The details of second switch $110_Z$ are omitted for purposes of clarity.

As depicted in FIG. 1, first link $115_1$ and second link $115_2$ are assigned to a link aggregation group 114 (and, thus, associated EPs $112_{E1}$ and $112_{E2}$ may also be considered to be assigned to a link aggregation group 114). The link aggregation group 114 is a logical grouping of links connecting adjacent switches (illustratively, switches 110). The first switch $110_A$ receives packets via IPs $112_I$. In response to a determination that a received packet should be forwarded to second switch $110_Z$, first switch $110_A$ identifies the link aggregate group having links that connect first switch $110_A$ and second switch $110_Z$ (namely, link aggregation group 114). The first switch $110_A$ selects one of the EPs $112_E$ of link aggregation group 114. The first switch $110_A$ forwards the packet to the selected one of the EPs $112_E$ for propagation to second switch $110_Z$ via the corresponding link 115.

For purposes of clarity in describing the invention, assume that an implementation in which the switches 110 are Ethernet switches, each of the IPs $112_I$ is a 100 Mbs port, and each IP $112_I$ supports only one data stream. Further assume that EP $112_{E1}$ is a 1 Gbps port (and, thus, that the first link $115_1$ has a link speed of 1 Gbps) and that EP $112_{E2}$ is a 100 Mbps port (and, thus, that the second link $115_2$ has a link speed of 100 Mbps). This example will be used herein to describe the weighted link aggregation functions of the present invention.

Figure 2:
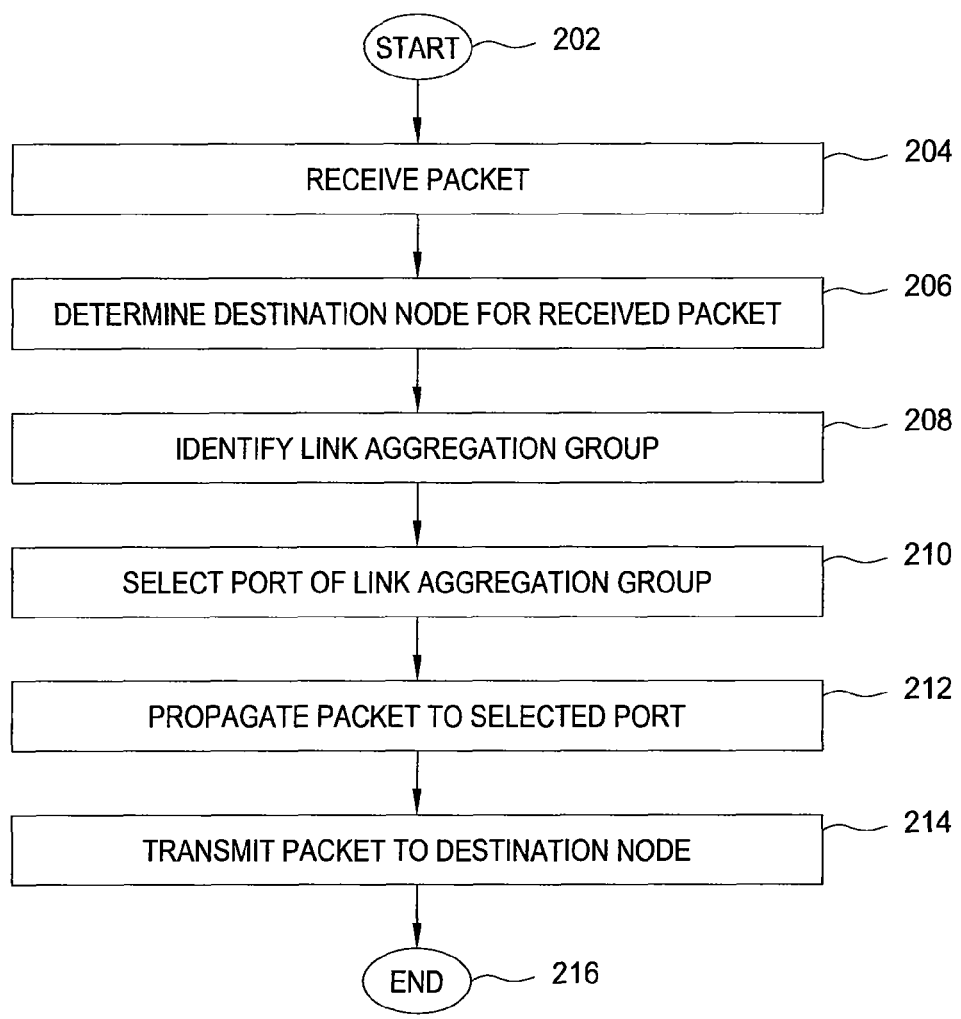
FIG. 2 depicts a method according to one embodiment of the present invention.

FIG. 2 depicts a method according to one embodiment. Specifically, method 200 of FIG. 2 includes a method for propagating a packet from an ingress port to an egress port using weighted link aggregation. Although depicted and described as being performed serially, at least a portion of the steps of method 200 may be performed contemporaneously, or in a different order than depicted and described with respect to FIG. 2. The method 200 begins at step 202 and proceeds to step 204.

At step 204, a packet is received at an ingress port of a node (denoted as a source node). At step 206, a destination node for the received packet (e.g., a next-hop node to which the packet must be forwarded) is determined. The destination node may be determined in any manner. In one embodiment, for example, the destination node may be determined from a header field(s) of the received packet.

At step 208, a link aggregation group is identified (or, in the case of multiple available link aggregation groups, selected) based on the destination node. The link aggregation group is a logical grouping of multiple links that connect the source node to the destination node. The link aggregation group may also be considered to include the multiple ports associated with the multiple links connecting the source node to the destination node. The packet may be propagated to the destination node using any of the ports (and, thus, associated links) of the link aggregation group.

At step 210, one of the ports of the link aggregation group is selected. The port is selected as the port by which the packet is propagated to the destination node. The port is selected based on weighting of link speeds of links associated with the ports of the link aggregation group. Since the port associated with a link may be considered to have a port speed equal to the link speed of that link, the selection may alternatively be considered to be performed based on weighting of port speeds of ports associated with the links of the link aggregation group.

In one embodiment, the port is selected using a port selection table. An exemplary port selection table adapted for use in selection one of the ports of the link aggregation group is depicted and described with respect to FIG. 3. A method for selecting one of the ports of the link aggregation group using a port selection table is depicted and described with respect to FIG. 4.

At step 212, the packet is propagated to the selected port of the link aggregation group. The packet may be propagated from the ingress port to the egress port in any manner. At step 214, the packet is transmitted to the destination node using the link associated with the selected port of the link aggregation group.

At step 216, method 200 ends. Although depicted and described as ending (for purposes of clarity), method 200 of FIG. 2 is performed for each packet received at the node in order to direct received packets through the node from ingress ports to egress ports.

As described herein, a port selection table utilized for selecting one of the ports of a link aggregation group includes multiple table entries. The port selection table includes at least one table entry associated with each of the ports of the link aggregation group. In one embodiment, the entries of the port selection table are weighted according to the port speeds of the ports of the link aggregation group (and, thus, according to the link speeds of the links associated with the ports of the link aggregation group). In one such embodiment, for example, for each port of the link aggregation group, the number of entries in the port selection table is substantially proportional to the port speed of that port (and, thus, the link speed of that associated link).

As an example, assume that a port selection table for port aggregation group 114 of first switch $110_A$ is configured to have eight total table entries. In this example, based on link speeds of 1 Gbps and 100 Mbps associated with first and second links $115_1$ and $115_2$, respectively, seven of the table entries of the port selection table will be associated with EP $112_{E1}$ (i.e., such that selection of any of the seven entries results in the packet being routed via EP $112_{E1}$ and first link $115_1$) and one of the table entries of the port selection table will be associated with EP $112_{E2}$ (i.e., such that only selection of that one table entry results in the packet being routed via EP $112_{E2}$ and second link $115_2$).

FIG. 3 depicts an exemplary port selection table. Specifically, port selection table 300 is an exemplary port selection table for link aggregation group 114 of first switch $110_A$ of FIG. 1. The port selection table 300 includes eight table entries. The port selection table 300 includes two types of fields (an index field and a port identified field) and, thus, each table entry includes two values (an index value and a port identifier value). The index values are denoted as I1-I8. The port identifier values are denoted as Port1 (for EP $112_{E1}$) and Port2 (for EP $112_{E1}$).

As described with respect to FIG. 1, Port1 and Port2 have respective ports speeds of 1 Gbps and 100 Mbps (and, similarly, first link $115_1$ and second link $115_2$ associated with Port1 and Port2 have link speeds of 1 Gbps and 100 Mbps, respectively). Thus, since entries of port selection table 300 have been weighted based on speeds of the ports/links associated with the ports represented by port selection table 300, seven entries of port selection table 300 have a value of Port1 in the port identifier field and one entry of port selection table 300 has a value of Port2 in the port identified field. The use of values Port1 and Port2 is merely for purposes of clarity (i.e., any value which may be used to identify a port may be used).

Thus, by weighting entries of port selection table 300 according to the speeds of the ports/links associated with the ports/links represented by port selection table 300, since entries of port selection table 300 are selected randomly (e.g., using a hashing function), the probability that a table entry corresponding to Port1 is selected is seven times greater than the probability that a table entry corresponding to Port2 is selected, thereby ensuring that more data traffic is directed to be routed over the faster port/link (1 Gbps) than is directed to be routed over the slower port/link (100 Mbs).

In other words, weighting entries of a port selection table according to speeds of ports/links associated with ports/links represented by the port selection table ensures that traffic is apportioned between ports of a link aggregation group according to respective link speeds of the links associated with those ports. Referring to port selection table 300, data traffic is seven times more likely to be directed for transmission using the 1 Gbps link than to be directed for transmission using the 100 Mbps link, which is clearly a desired result in order to realize more efficient utilization of ports in the link aggregate group.

Although primarily depicted and described herein as having eight table entries, port selection table 300 could be implemented using almost any number of table entries. For example, in continuation of the example above, if port selection table 300 is implemented using sixteen table entries, fourteen of the table entries may identify EP $112_{E1}$ and two of the table entries may identify for EP $112_{E2}$. Similarly, for example, in continuation of the example above if port selection table 300 is implemented using thirty-two table entries, twenty-nine of the table entries may identify EP $112_{E1}$ and three of the table entries may identify EP $112_{E2}$.

In other words, a port selection table (such as port selection table 300 depicted and described with respect to FIG. 3) may be implemented using any number of table entries (as long as there is a sufficient number of table entries in the port selection table to support weighting according to the speeds of the ports/links associated with ports/links represented by the port selection table). A method for using a port selection table for selecting a port over which to transmit a packet is depicted and described with respect to FIG. 4. A method for creating a port selection table is depicted and described with respect to FIG. 5.

Figure 4:
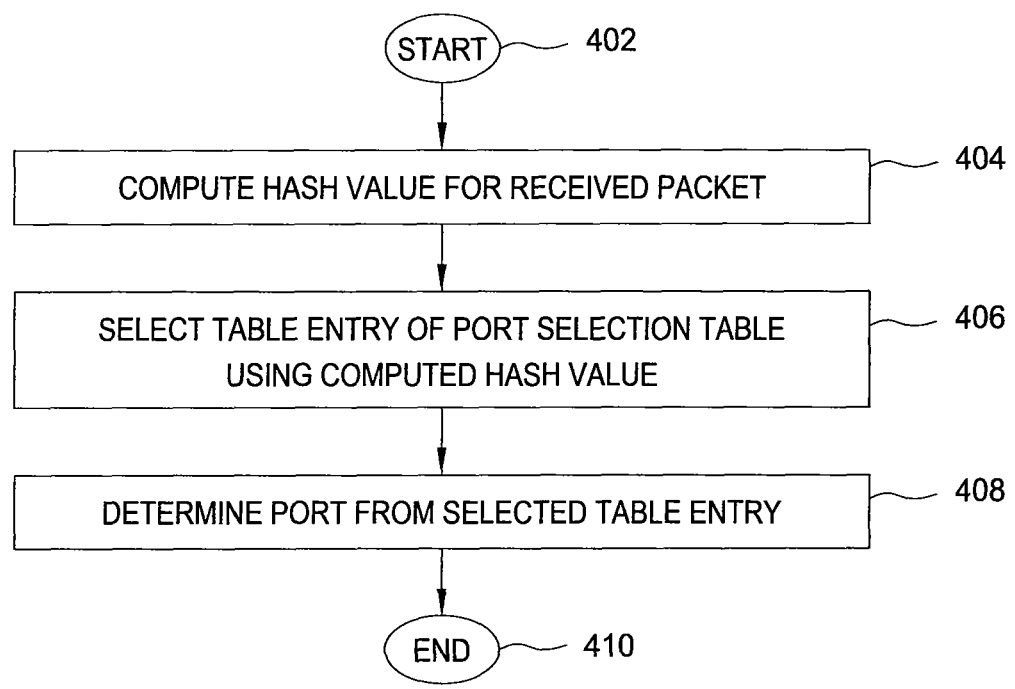
FIG. 4 depicts a method according to one embodiment of the present invention.

FIG. 4 depicts a method according to one embodiment of the present invention. Specifically, method 400 of FIG. 4 includes a method for selecting one of the ports of a link aggregation group using a port selection table. Although depicted and described as being performed serially, at least a portion of the steps of method 400 may be performed contemporaneously, or in a different order than depicted and described with respect to FIG. 4. The method 400 begins at step 402 and proceeds to step 404.

At step 404, a hash value is computed for the received packet. The hash value may be computed using any hashing function. The hash value is computed over at least one of the fields of the received packet. For example, the hash value may be computed over the last three bits of the source MAC address and the last three bits of the destination MAC address from the header of the received packet. The hash value may be computed in many other ways.

At step 406, one of the table entries of the port selection table is selected using the computed hash value. The table entry may be selected using the computed hash value in any manner. In one embodiment, for example, in which the port selection table includes an index field and a port identified field, the computed hash value is used to search the index fields of the port selection table and the table entry of the port selection table having an index value that matches the computed hash value is selected.

At step 408, the port that is associated with the selected table entry of the port selection table is determined. The port associated with the selected table entry is determined from the selected table entry of the port selection table. In one embodiment, for example, in which the port selection table includes an index field and a port identified field, a port identifier value is read from the port identifier field associated with the index field of the selected table entry.

At step 410, method 400 ends. Although depicted and described as ending (for purposes of clarity), method 400 of FIG. 4 is performed for each packet received at the node in order to direct received packets through the node from ingress ports to egress ports using a port selection table weighted according to speeds of ports/links associated with ports/links of the link aggregation group.

Figure 5:
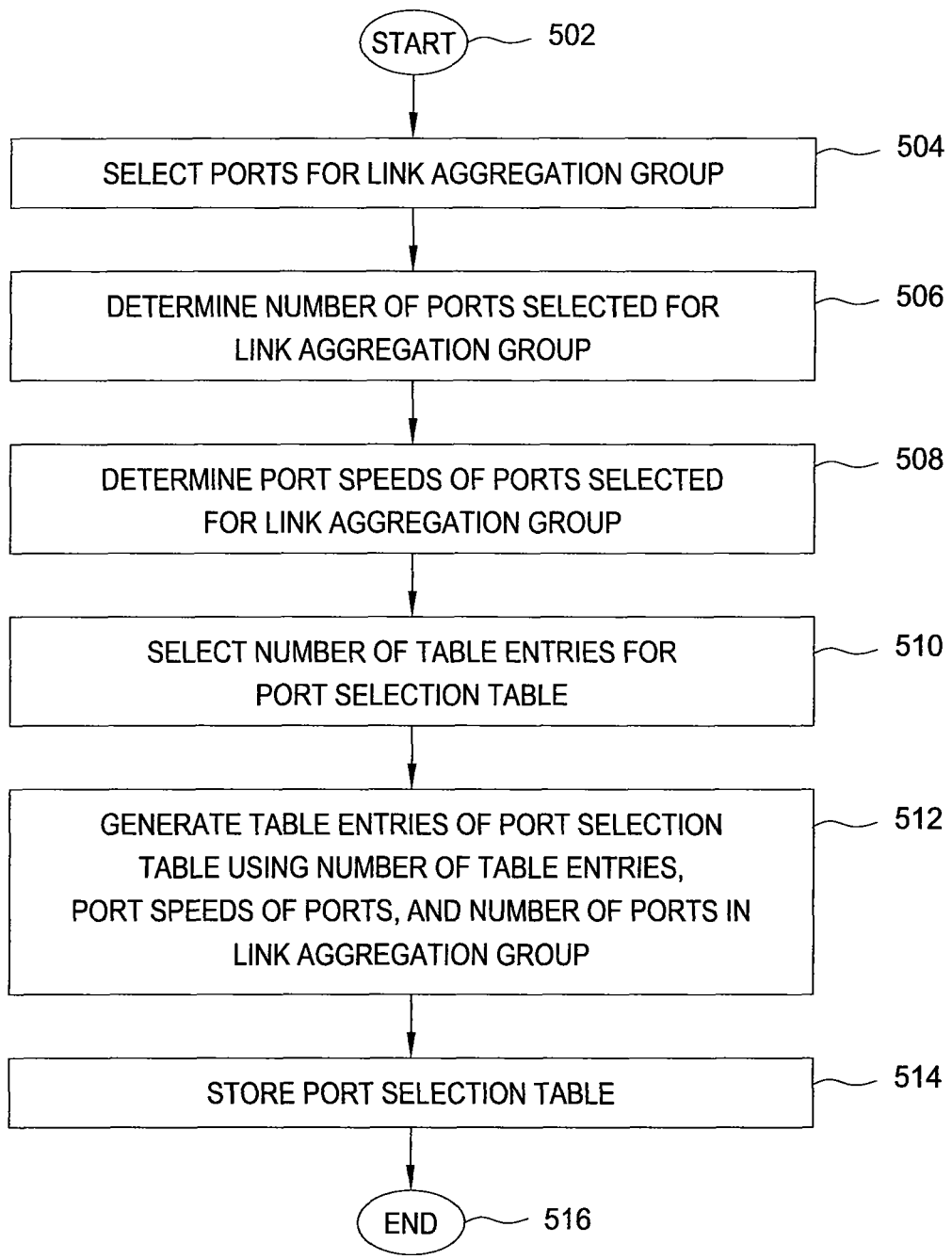
FIG. 5 depicts a method according to one embodiment of the present invention.

FIG. 5 depicts a method according to one embodiment of the present invention. Specifically, method 500 of FIG. 5 includes a method for creating a port selection table. Although depicted and described as being performed serially, at least a portion of the steps of method 500 may be performed contemporaneously, or in a different order than depicted and described with respect to FIG. 5. The method 500 begins at step 502 and proceeds to step 504.

At step 504, ports are selected for inclusion in the link aggregation group. The ports selected for inclusion in the link aggregation group include ports associated with links between two adjacent switches (and may include all such ports or a subset of such ports). At step 506, the number of ports selected for inclusion in the link aggregation group is determined. At step 508, for each port selected for inclusion in the link aggregation group, the associated port/link speed is determined.

At step 510, the number of table entries for the port selection table is selected. This may be based on the number of ports selected for inclusion in the link aggregation group, the speeds of ports/links associated with ports selected for inclusion in the link aggregation group, one or more constraints associated with use of the port selection table (e.g., table memory constraints, table lookup time constraints, and the like), and the like, as well as various combinations thereof.

At step 512, table entries of the port selection table are generated. In one embodiment, each table entry includes an index value and a port identifier value.

The index values included in the index field of the port selection table may be generated in any manner (e.g., depending on the hash function to be used for accessing the port selection table).

The port identifier values included in the port field of the port selection table may be generated using the number of table entries, the port/link speeds of the port/links associated with ports included in the link aggregation group, the number of ports in the link aggregation group, and the like, as well as various combinations thereof.

As an example, assume that four ports (denoted as port1, port2, port3, and port4 having link speeds of 100 Mbps, 100 Mbps, 1 Gbps, and 10 Gbps, respectively, and associated with four links having link speeds of 100 Mbps, 100 Mbps, 1 Gbps, and 10 Gbps, respectively) have been selected for inclusion in a link aggregate group. In this example, the number of table entries included in the port selection table may be selected to be sixty-four (e.g., based on the number of ports and the associated link speeds).

In continuation of this example, based on the port/link speeds of 100 Mbps, 100 Mbps, 1 Gbps, and 10 Gbps, a determination is made that approximately 90% of the table entries should be associated with port4, approximately 9% of the table entries should be associated with port3, and approximately 1% of the table entries should be split between port2 and port1.

In continuation of this example, based on the weighting percentages determined for the four ports for the port selection table, the port value will be set to port4 for fifty-four of the sixty-four entries, the port value will be set to port3 for eight of the sixty-four entries, the port value will be set to port2 for one of the sixty-four entries, and the port value will be set to port1 for one of the sixty-four entries.

At step 514, the port selection table is stored. The port selection table may then be used to forward packets between nodes via the link aggregation group using weighted link aggregation (as depicted and described herein)

At step 516, method 500 ends. Although depicted and described as ending (for purposes of clarity), the port selection table may be modified (or recreated) as needed (e.g., if a port is added to or removed from the link aggregation group, if the link speed of one of the links changes, and the like).

In one embodiment, the present invention may be implemented as a modified version of the IEEE 802.3ad link aggregation standard (i.e., modified as depicted and described herein such that links having different link speeds may belong to the same link aggregation group, however, still utilizing at least some portions of the IEEE 802.3ad link aggregation standard).

Although primarily depicted and described herein with respect to specific numbers of link aggregation groups supported between switches, ports included in the link aggregation group, entries included in the port selection table, and like parameters, other numbers of link aggregation groups supported between switches, ports included in the link aggregation group, entries included in the port selection table, and like parameters may be supported.

Although primarily depicted and described herein within the context of an Ethernet-based communication network using Ethernet switches, weighted link aggregation as described herein may be implemented within any network switches adapted for using link aggregation. Although primarily depicted and described herein with respect to link aggregation between switches, weighted link aggregation as described herein may be implemented between any network elements capable of using link aggregation.

Figure 6:
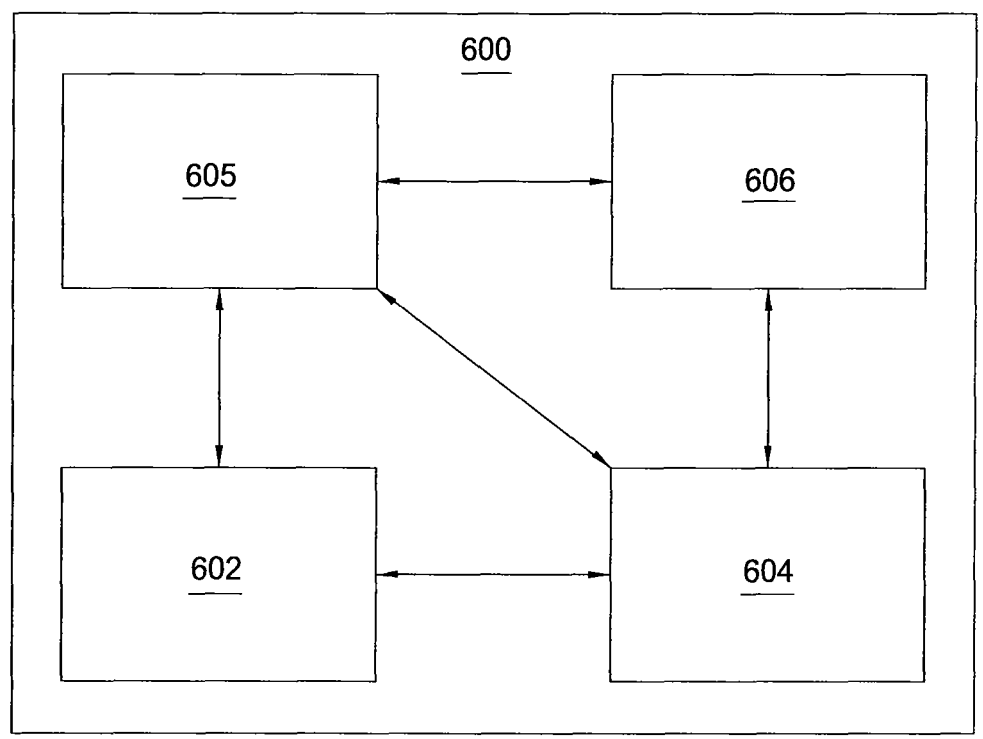
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a link aggregation module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the functions/elements described herein may be implemented in software and/or in a combination of software and hardware, e.g., using application specific integrated circuits (ASIC), a general purpose computer or any other hardware equivalents. In one embodiment, the present link aggregation process 605 can be loaded into memory 604 and executed by processor 602 to implement the functions as discussed above. As such, link aggregation process 605 (including associated data structures) described herein can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for forwarding a packet from a first node toward a second node using a link aggregation group comprising a plurality of links connecting the first node and the second node, comprising:
   receiving the packet at the first node, the first node maintaining a port selection table configured to provide a weighting of the ports of the link aggregation group according to a respective plurality of port speeds of the ports of the link aggregation group;
      wherein, for each port of the link aggregation group, a respective number of table entries of the port selection table is substantially proportional to the port speed of the port of the link aggregation group;
      wherein, for each table entry of the port selection table, the table entry includes an index value and a port identifier value indicative of one of the ports with which the table entry is associated; and
   selecting one of the ports of the link aggregation group by using a hash value computed for the packet as a key into the port selection table, the selected one of the ports of the link aggregation group being identified by a port identifier value included within a table entry having an index value associated with the computed hash value; and
   propagating the packet from the first node toward the second node via the selected one of the ports of the link aggregation group.

2. The method of claim 1, wherein the hash value for the packet is computed using at least one value from the received packet.

3. The method of claim 1, further comprising:
   determining a destination node for the packet; and
   identifying the link aggregation group using the destination node.

4. An apparatus for forwarding a packet from a first node toward a second node using a link aggregation group comprising a plurality of links connecting the first node and the second node, comprising:
   a processor and a memory, the processor configured to:
   receive the packet at the first node, the first node maintaining a port selection table configured to provide a weighting of the ports of the link aggregation group according to a respective plurality of port speeds of the ports of the link aggregation group;
      wherein, for each port of the link aggregation group, a respective number of table entries of the port selection table is substantially proportional to the port speed of the port of the link aggregation group;
      wherein, for each table entry of the port selection table, the table entry includes an index value and a port identifier value indicative of one of the ports with which the table entry is associated; and
   select one of the ports of the link aggregation group by using a hash value computed for the packet as a key into the port selection table, the selected one of the ports of the link aggregation group being identified by a port identifier value included within a table entry having an index value associated with the computed hash value; and
   propagate the packet from the first node toward the second node via the selected one of the ports of the link aggregation group.

5. The apparatus of claim 4, wherein the hash value for the packet is computed using at least one value from the received packet.

6. The apparatus of claim 4, wherein the processor is configured to:
   determine a destination node for the received packet; and
   identify the link aggregation group using the destination node.

7. A method for creating a port selection table for a link aggregation group, comprising:
   determining a number of ports selected for inclusion in a link aggregation group;
   determining respective port speeds of the ports selected for inclusion in the link aggregation group;
   selecting a number of table entries for the port selection table;
   generating table entries for the port selection table using the number of table entries, the port speeds, and the number of ports in the link aggregation group; and
   storing the port selection table in a memory.

8. The method of claim 7, wherein the number of table entries for the port selection table is selected using the port speeds of the ports and the number of ports in the link aggregation group.

9. The method of claim 7, wherein generating the table entries for the port selection table comprises:
   generating at least one table entry for each port selected for inclusion in the link aggregation group.

10. The method of claim 7, wherein, for each port of the link aggregation group, a number of table entries generated for the port selection table is substantially proportional to the port speed of that port of the link aggregation group.

11. The method of claim 7, wherein each table entry comprises an index value and a port identifier value.

12. The method of claim 7, further comprising:
   in response to receiving a packet, selecting one of the ports of the link aggregation group using the port selection table; and propagating a received packet via the selected one of the ports of the link aggregation group.

* * * * *